(12) United States Patent
Maezawa

(10) Patent No.: US 7,974,008 B2
(45) Date of Patent: Jul. 5, 2011

(54) POLARIZING PLATE AND IMAGE DISPLAY USING THE SAME

(75) Inventor: Shohei Maezawa, Ibaraki (JP)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 385 days.

(21) Appl. No.: 12/354,586

(22) Filed: Jan. 15, 2009

(65) Prior Publication Data

US 2009/0185270 A1   Jul. 23, 2009

(30) Foreign Application Priority Data

Jan. 18, 2008 (JP) ................................. 2008-009473

(51) Int. Cl.
*G02B 27/28* (2006.01)
*G02F 1/1335* (2006.01)

(52) U.S. Cl. ................. 359/483.01; 359/490.01; 349/96

(58) Field of Classification Search ........ 359/483.01–494.01; 349/96
See application file for complete search history.

(56) References Cited

U.S. PATENT DOCUMENTS

| | | | | |
|---|---|---|---|---|
| 3,449,576 A | * | 6/1969 | Lipp et al. | 359/489.11 |
| 3,538,322 A | * | 11/1970 | Arsem | 362/19 |
| 4,726,684 A | * | 2/1988 | Tokumaru | 356/435 |
| 6,292,296 B1 | * | 9/2001 | Choi et al. | 359/485.02 |
| 6,542,298 B1 | * | 4/2003 | Aoki | 359/485.03 |
| 7,911,696 B1 | * | 3/2011 | Choi et al. | 359/486.02 |
| 2008/0158673 A1 | * | 7/2008 | Maeda et al. | 359/495 |
| 2009/0033836 A1 | * | 2/2009 | Kamada | 349/96 |

FOREIGN PATENT DOCUMENTS

| | | | |
|---|---|---|---|
| JP | 05235429 A | * | 9/1993 |
| JP | 8-160223 A | | 6/1996 |
| JP | 11231129 A | * | 8/1999 |
| JP | 2001330724 A | * | 11/2001 |

* cited by examiner

*Primary Examiner* — Frank G Font
(74) *Attorney, Agent, or Firm* — Westerman, Hattori, Daniels & Adrian, LLP

(57) ABSTRACT

A polarizing plate of the present invention comprises: main four sides which form a quadrangle or a substantially quadrangular shape, wherein the quadrangle or the substantially quadrangular shape is a non-rectangular shape having four interior angles each of which is in the range of 80° to 100°, provided that at least two of the four interior angles are not 90°, the non-rectangular polarizing plate has an in-plane absorption axis, a largest rectangle having four sides in directions parallel and perpendicular to the absorption axis of the polarizing plate can be drawn as a hypothetical rectangle in the plane of the non-rectangular polarizing plate, the hypothetical rectangle has a side which is closest to the non-rectangular shape and makes angles in the range of 0° to 5° with the non-rectangular shape, and at least one of the angles is an acute angle in the range of 1° to 5°. The polarizing plate can smoothly undergo reworking even when it has a reduced thickness.

6 Claims, 3 Drawing Sheets

[FIG.1]
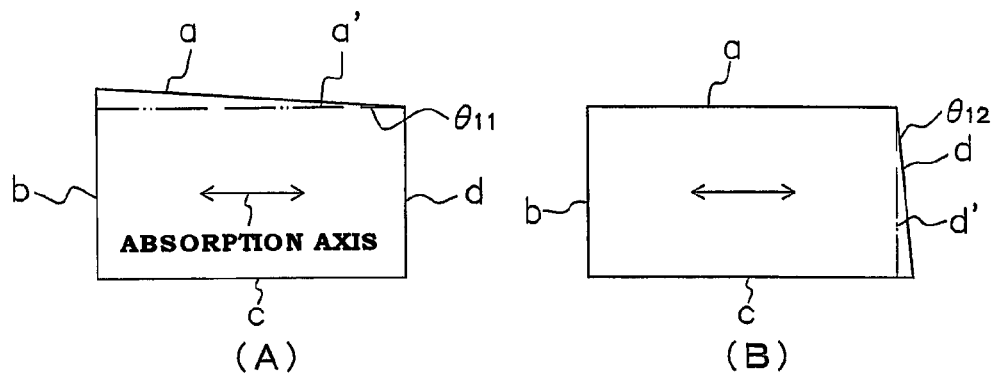
[FIG.2]
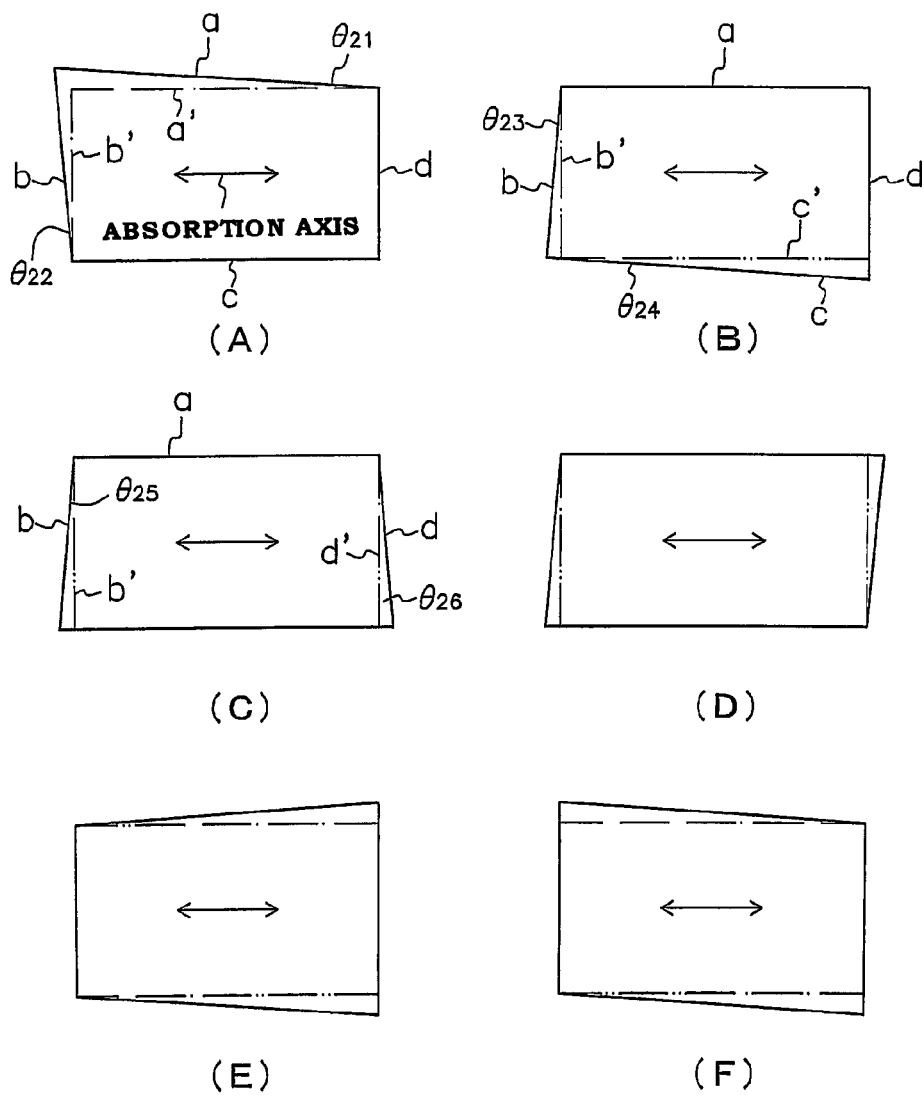

[FIG.3]
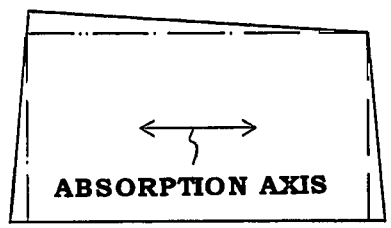
(A)
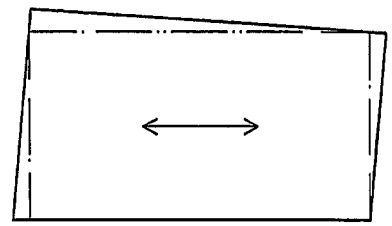
(B)
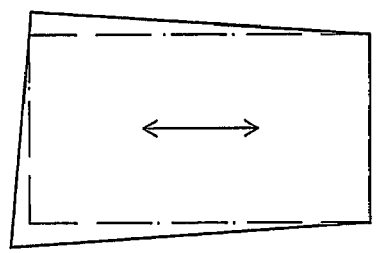
(C)
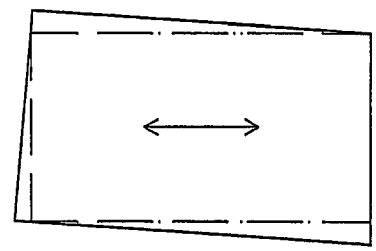
(D)
[FIG.4]
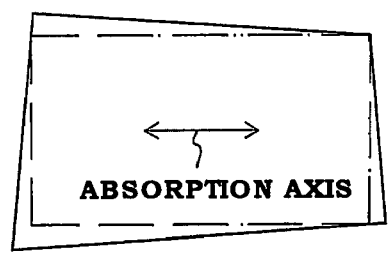
(A)
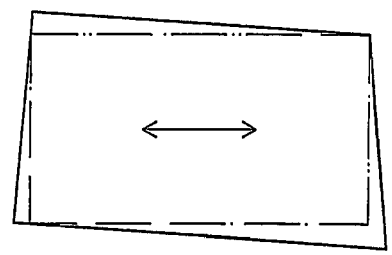
(B)
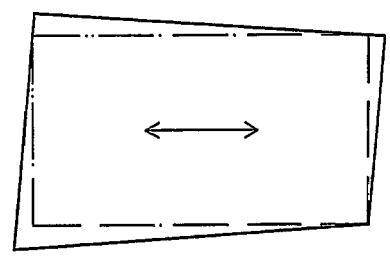
(C)
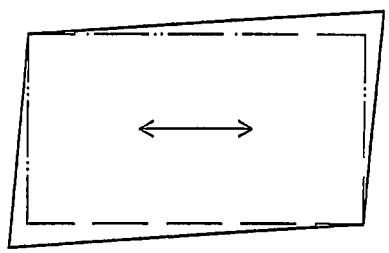
(D)

[FIG.5]
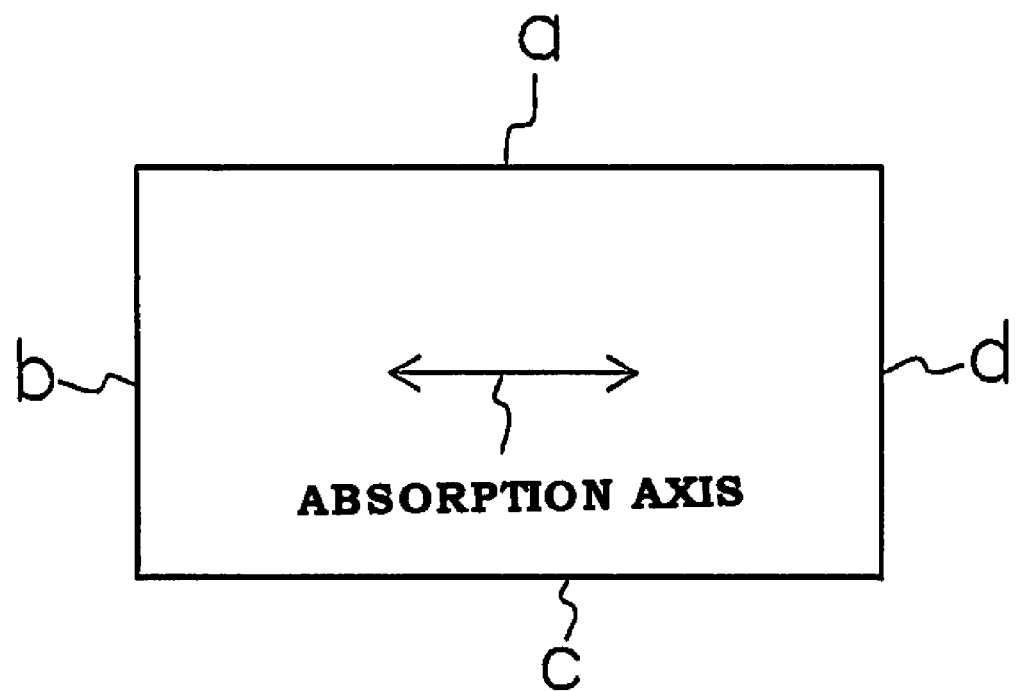

POLARIZING PLATE AND IMAGE DISPLAY USING THE SAME

BACKGROUND OF THE INVENTION

1. Field of the Invention

The present invention relates to a polarizing plate. The polarizing plate may be used alone or in the form of a laminated optical film to form an image display such as a flat panel display such as a liquid crystal display (LCD) or an electroluminescence display (ELD), a plasma display (PD), or a field emission display (FED).

2. Description of Related Art

Image display, typically LCDs, include devices that display characters and images with the aid of the electro-optical properties of liquid crystal molecules. According to the image display system, such LCDs use a liquid crystal panel including a liquid crystal cell and polarizing plates placed on both sides of the liquid crystal cell. Such polarizing plates are conventionally rectangular. Further, rectangular polarizing plates with truncated corners are also known (see JP-A 08-160223), but such polarizing plates are also basically rectangular.

When the polarizing plates are placed on a liquid crystal cell, a pressure-sensitive adhesive is generally used to laminate them together. In the laminating process, for example, if the laminated polarizing plate is misaligned or foreign matter is caught on the laminating surface, the polarizing plate will be peeled from the liquid crystal cell so that the liquid crystal cell can be recycled. The process of peeling the polarizing plate is called "reworking." However, if the polarizing plate tears or breaks and partially remains on the liquid crystal cell in the process of reworking the polarizing plate, recycling of the liquid crystal cell will be disturbed. Further, in recent years, LCDs have been required to be thin mainly for mobile applications. Under the circumstances, polarizing plates have been reduced in thickness so that the reworking can be vulnerable to the trouble.

SUMMARY OF THE INVENTION

An object of the present invention is to provide a polarizing plate which can smoothly undergo reworking even when it has a reduced thickness.

Further, another object of the present invention is to provide an optical film using such a polarizing plate and to provide an image display using such a polarizing plate or such an optical film.

As a result of investigations to solve the problems, the inventors have found that the objects can be achieved with the polarizing plate described below, and have completed the present invention.

The present invention relates to a polarizing plate, comprises:

main four sides which form a quadrangle or a substantially quadrangular shape, wherein the quadrangle or the substantially quadrangular shape is a non-rectangular shape having four interior angles each of which is in the range of 80° to 100°, provided that at least two of the four interior angles are not 90°, the non-rectangular polarizing plate has an in-plane absorption axis, a largest rectangle having four sides in directions parallel and perpendicular to the absorption axis of the polarizing plate can be drawn as a hypothetical rectangle in the plane of the non-rectangular polarizing plate, the hypothetical rectangle has a side which is closest to the non-rectangular shape and makes angles in the range of 0° to 5° with the non-rectangular shape, and at least one of the angles is an acute angle in the range of 1° to 5°.

In the polarizing plate, it is preferable that the polarizing plate has a thickness of 120 μm or less.

In the polarizing plate, it is preferable that the non-rectangular polarizing plate has a longest side with a length of 700 mm or more.

The present invention also relates to an optical film, comprising a laminate having at least one piece of the polarizing plate.

The present invention also relates to an image display, comprising the polarizing plate or the optical film.

When a rectangular polarizing plate is reworked, a corner of the rectangle is pinched and pulled in the diagonal direction of the rectangle so that the polarizing plate is peeled from a liquid crystal cell or the like. In this peeling process, the polarizing plate can tear or break. In rectangular polarizing plate, the absorption axis (the film stretching direction) makes an angle of 0°, 90° or 45° with the side. The reason why rectangular polarizing plates having such an absorption axis tear or break in the peeling process has been studied, and as a result, it has been considered that rectangular polarizing plates tend to tear at the angle of their absorption axis with respect to the diagonal direction of the rectangle in which they are peeled.

In an embodiment of the present invention, therefore, the shape of the polarizing plate is changed from a conventional rectangle to a non-rectangular shape, and at the same time, the non-rectangular polarizing plate is designed in such a manner that it surely covers a certain rectangular polarizing plate area (a hypothetical rectangular polarizing plate with an absorption axis parallel or perpendicular to a side of the hypothetical rectangle) and at the same time that at least one acute angle between a side of the non-rectangular shape and a side of the hypothetical rectangle is in the range of 1 to 5°. The non-rectangular polarizing plate designed in such a manner is prevented from tearing or breaking in the reworking process. In such a non-rectangular polarizing plate, specifically, the angle (acute angle) between its absorption axis and the diagonal direction (the diagonal) of the non-rectangular shape can be made larger than the angle (acute angle) between the absorption axis of the conventional rectangular polarizing plate (corresponding to the hypothetical rectangular area of the non-rectangular polarizing plate of the present invention) and the diagonal direction (diagonal) of the rectangle. As a result, the force applied in the absorption axis direction can be reduced so that the non-rectangular polarizing plate of the present invention can be prevented from tearing or breaking during the reworking process.

Reworking troubles with polarizing plates may often occur when the polarizing plates are made thin or large. In particular, therefore, the non-rectangular polarizing plate of the present invention is effectively used to form a thin polarizing plate with a thickness of 120 μm or less or to form a large polarizing plate whose non-rectangular shape has a longest side of 700 mm or more.

BRIEF DESCRIPTION OF DRAWINGS

FIGS. 1A and 1B are schematic diagrams each showing an example of the non-rectangular polarizing plate of the present invention;

FIGS. 2A to 2F are schematic diagrams each showing an example of the non-rectangular polarizing plate of the present invention;

FIGS. 3A to 3D are schematic diagrams each showing an example of the non-rectangular polarizing plate of the present invention;

FIGS. 4A to 4D are schematic diagrams each showing an example of the non-rectangular polarizing plate of the present invention; and FIG. 5 is a schematic diagram showing an example of the conventional rectangular polarizing plate.

DETAILED DESCRIPTION OF THE INVENTION

The non-rectangular polarizing plate of the present invention is described below with reference to the drawings. The non-rectangular polarizing plate of the present invention is shown in each of FIGS. 1 to 4. FIG. 5 shows a conventional rectangular polarizing plate.

The non-rectangular polarizing plate of the present invention has main four sides which form a quadrangle or a substantially quadrangular shape.

The quadrangle or the substantially quadrangular shape formed by the four sides has four interior angles each of which is in the range of 80° to 100°, provided that at least two of the four interior angles are not 90°.

Here, the term "substantially quadrangular shape" is intended to include cases where at least one of the four corners does not form an apex angle but forms a round shape such as part of a circle or an ellipse and cases where at least one apex angle is worked, specifically truncated. That is, this means that some forms even with a worked apex angle or apex angles may be recognized as quadrangles. In general, when an apex angle or apex angles are worked, less than 1% of one side may be worked with respect to one side of the quadrangle before working.

Further, the non-rectangular polarizing plate of the present invention has an in-plane absorption axis. A largest rectangle having four sides in directions parallel and perpendicular to the absorption axis of the polarizing plate can be drawn as a hypothetical rectangle in the plane of the non-rectangular polarizing plate. The hypothetical rectangle has a side that is closest to the non-rectangular shape of the polarizing plate and makes at least one acute angle in the range of 1° to 5° with the non-rectangular shape. In FIGS. 1 to 4, each side of such a hypothetical rectangle is drawn with broken lines, while a side or sides of the hypothetical rectangle overlapping with a side or sides of the non-rectangular shape are shown by solid lines for the non-rectangular shape. Here, when the non-rectangular shape is a substantially quadrangular shape, the acute angle is formed by lines each extended from each side.

When angles formed by the sides of the non-rectangular shape and the hypothetical rectangle closest to each other are each in the range of 0 to 50, and at least one of the angles is set so as to be an acute angle of 1 to 5°. If the acute angle is less than 1°, the reworkability cannot be sufficiently improved. On the other hand, if the acute angle is more than 5°, the non-rectangular polarizing plate can have a large angle that makes it difficult to handle the polarizing plate. Here, the acute angle is preferably in the range of 2° to 4°. When at least one of the acute angles is in the above range, any other acute angle may be less than 1°.

In FIGS. 1 to 4, the non-rectangular shape has sides a, b, c, and d, while the hypothetical rectangle has sides a', b', c', and d'. In FIG. 5, the rectangle has sides a, b, c, and d.

FIGS. 1A and 1B each show a case where one of the sides of a non-rectangular shape is not parallel or perpendicular to the absorption axis, while other three sides of the non-rectangular shape coincide with three sides of the hypothetical rectangle. Specifically, in FIG. 1A, the sides b, c and d of the non-rectangular shape coincide with the sides of the hypothetical rectangle, while the side a of the non-rectangular shape and the side a' of the hypothetical rectangle closest thereto make an acute angle $\theta 11$. In this case, the non-rectangular shape according to the present invention is designed to satisfy the requirement that the acute angle $\theta 11$ be in the range of 1 to 5°. In FIG. 1B, the sides a, b and c of the non-rectangular shape coincide with the sides of the hypothetical rectangle, while the side d of the non-rectangular shape makes an acute angle $\theta 12$ with the side d' of the hypothetical rectangle, which is closest to the side d. Here, in FIGS. 1A and 1B, two interior angles are each 90°, and, therefore, the remaining angle other than the acute angle component-containing angle is in the range of 85 to 89°.

FIGS. 2A to 2F show cases where two sides of the non-rectangular shape are not parallel or perpendicular to the absorption axis, while other two sides of the non-rectangular shape coincide with two sides of the hypothetical rectangle.

In FIG. 2A, the sides c and d coincide with the sides of the hypothetical rectangle. On the other hand, the sides a and b make acute angles $\theta 21$ and $\theta 22$ with the sides a' and b' of the hypothetical rectangle, respectively, which are closest to the sides a and b, respectively. In this case, the non-rectangular shape according to the present invention is designed in such a manner that the acute angles $\theta 21$ and $\theta 22$ are each in the range of 0 to 5° and at least one of the acute angles $\theta 21$ and $\theta 22$ satisfies the range of 1 to 5°. Here, in FIG. 2A, one interior angle is 90°, and, therefore, one remaining interior angle other than the acute angle component-containing angles is in the range of 80° to less than 85°.

In FIG. 2B, the sides a and d of the non-rectangular shape coincide with the sides of the hypothetical rectangle. On the other hand, the sides b and c of the non-rectangular shape make acute angles $\theta 23$ and $\theta 24$ with the sides b' and c' of the hypothetical rectangle, respectively, which are closest to the sides b and c, respectively. In this case, the non-rectangular shape according to the present invention is designed in such a manner that the acute angles $\theta 23$ and $\theta 24$ are each in the range of 0 to 5° and at least one of the acute angles $\theta 23$ and $\theta 24$ satisfies the range of 1 to 5°. Here, in FIG. 2B, one interior angle is 90°, and, therefore, the other three interior angles are each in the range of 85 to 95°, exclusive of 90°.

In FIGS. 2C to 2F, two sides of the non-rectangular shape parallel or perpendicular to the absorption axis coincide with two sides of the hypothetical rectangle. In FIG. 2C, the sides a and c of the non-rectangular shape coincide with the sides of the hypothetical rectangle. On the other hand, the sides b and d of the non-rectangular shape make acute angles $\theta 25$ and $\theta 26$ with the sides b' and d' of the hypothetical rectangle, respectively, which are closest to the sides b and d, respectively. In this case, the non-rectangular shape according to the present invention is designed in such a manner that the acute angles $\theta 25$ and $\theta 26$ are each in the range of 0 to 5° and at least one of the acute angles $\theta 25$ and $\theta 26$ satisfies the range of 1 to 5°. Here, in FIG. 2C, four interior angles are each in the range of 85 to 95°, exclusive of 90°. FIGS. 2D to 2F are not described in detail, but they are understandable in the same way as FIG. 2C.

FIGS. 3A to 3D show cases where three sides of the non-rectangular shape are not parallel or perpendicular to the absorption axis, while one side of the non-rectangular shape coincides with one side of the hypothetical rectangle. FIGS. 4A to 4D show cases where four sides of the non-rectangular shape are not parallel or perpendicular to the absorption axis, and the sides of the non-rectangular shape do not coincide with the sides of the hypothetical rectangle. Here, FIGS. 3A to 3D and FIGS. 4A to 4D are not described in detail, but it will be understood that three acute angles formed in each of FIGS. 3A to 3D are each in the range of 0 to 5°, while at least one of the acute angles is designed to be in the range of 1 to 5° and that four acute angles formed in each of FIGS. 4A to 4D are each in the range of 0 to 5°, while at least one of the acute angles is designed to be in the range of 1 to 5°. FIGS. 3A to 3D and FIGS. 4A to 4D are understandable in the same way as FIGS. 1A to 2F, and four interior angles in each of FIGS. 3A to 3D and FIGS. 4A to 4D are each in the range of 80 to 100°, exclusive of 90°.

The present invention is suitable for cases where the non-rectangular polarizing plate has a thickness of 120 μm or less. The thickness is preferably 110 μm or less, more preferably 100 μm or less. In general, the polarizing plate of the present invention preferably has a thickness of 50 μm or more. Currently, a reduction in the thickness of liquid crystal display requires a reduction in the thickness of polarizing plates. Under the current circumstances, the thinner the polarizing plates, the more difficult the reworking and, therefore, the present invention can be more effective. Here, it should be noted that the thickness of conventional polarizing plates is 180 μm or more in view of handleability or the like.

The present invention is suitable for cases where the longest side of the non-rectangular polarizing plate is 700 mm or more. The side is preferably 830 mm or more, more preferably 890 mm or more. Reworkability is demanded mainly for large liquid crystal display for TV. Liquid crystal display for TV of 32 inches or lager is highly demanded, and a polarizing plate for 32-inch liquid crystal display generally has a side of about 700 mm or more. In general, the larger the polarizing plates, the more difficult the reworking, and the more expensive the liquid crystal panels, and, therefore, reworkability improvement is more demanded. In view of easy handling or the like, the length of one side of the polarizing plate should be 2500 mm or less.

Here, the hypothetical rectangle that can be drawn in the non-rectangular polarizing plate of the present invention preferably has such a shape that the ratio of its length in the absorption axis direction to its length in the direction perpendicular to the absorption axis direction is in the range of 1:0.56 to 1:0.58 or in the range of 1:1.74 to 1:1.77. The shape of the hypothetical rectangle may be appropriately determined depending on the rectangular shape of an image display for which the polarizing plate of the present invention is used.

Here, reworking of the non-rectangular polarizing plate of the present invention is generally performed in the direction of the diagonal of the polarizing plate. The reworking is preferably performed in the diagonal direction that is selected depending on the non-rectangular shape in such a manner that the angle (acute angle) between the absorption axis of the polarizing plate and the diagonal direction of the non-rectangular shape is relatively large.

The polarizing plate of the present invention generally includes a polarizer and a transparent protective film placed on one or both sides of the polarizer. In the polarizing plate, the polarizer and the transparent protective film are generally bonded together with an adhesive layer interposed therebetween, but the thickness of the polarizing plate of the present invention is defined so as not to include the thickness of the adhesive layer. The non-rectangular polarizing plate of the present invention is generally produced by cutting a polarizing plate into a non-rectangular shape, while it may be produced by bonding a non-rectangular polarizer to a transparent protective film having the same non-rectangular shape. For example, a Thomson die cutter, a Victoria die cutter, or the like may be used for the cutting.

A polarizer is not limited especially but various kinds of polarizer may be used. As a polarizer, for example, a film that is uniaxially stretched after having dichromatic substances, such as iodine and dichromatic dye, absorbed to hydrophilic high molecular weight polymer films, such as polyvinyl alcohol type film, partially formalized polyvinyl alcohol type film, and ethylene-vinyl acetate copolymer type partially saponified film; poly-ene type alignment films, such as dehydrated polyvinyl alcohol and dehydrochlorinated polyvinyl chloride, etc. may be mentioned. In these, a polyvinyl alcohol type film on which dichromatic materials such as iodine, is absorbed and aligned after stretched is suitably used. Although thickness of polarizer is not especially limited, the thickness of about 5 to 80 μm is commonly adopted.

A polarizer that is uniaxially stretched after a polyvinyl alcohol type film dyed with iodine is obtained by stretching a polyvinyl alcohol film by 3 to 7 times the original length, after dipped and dyed in aqueous solution of iodine. If needed the film may also be dipped in aqueous solutions, such as boric acid and potassium iodide, which may include zinc sulfate, zinc chloride. Furthermore, before dyeing, the polyvinyl alcohol type film may be dipped in water and rinsed if needed. By rinsing polyvinyl alcohol type film with water, effect of preventing un-uniformity, such as unevenness of dyeing, is expected by making polyvinyl alcohol type film swelled in addition that also soils and blocking inhibitors on the polyvinyl alcohol type film surface may be washed off. Stretching may be applied after dyed with iodine or may be applied concurrently, or conversely dyeing with iodine may be applied after stretching. Stretching is applicable in aqueous solutions, such as boric acid and potassium iodide, and in water bath.

A thermoplastic resin with a high level of transparency, mechanical strength, thermal stability, moisture blocking properties, isotropy, and the like may be used as a material for forming the transparent protective film. Examples of such a thermoplastic resin include cellulose resins such as triacetyl-cellulose, polyester resins, polyethersulfone resins, polysulfone resins, polycarbonate resins, polyamide resins, polyimide resins, polyolefin resins, (meth)acrylic resins, cyclic olefin polymer resins (norbornene resins), polyarylate resins, polystyrene resins, polyvinyl alcohol resins, and any mixture thereof. The transparent protective film is generally laminated to one side of the polarizer with the adhesive layer, but thermosetting resins or ultraviolet curing resins such as (meth)acrylic, urethane, acrylic urethane, epoxy, or silicone resins may be used to other side of the polarizer for the transparent protective film. The transparent protective film may also contain at least one type of any appropriate additive. Examples of the additive include an ultraviolet absorbing agent, an antioxidant, a lubricant, a plasticizer, a release agent, an anti-discoloration agent, a flame retardant, a nucleating agent, an antistatic agent, a pigment, and a colorant. The content of the thermoplastic resin in the transparent protective film is preferably from 50 to 100% by weight, more preferably from 50 to 99% by weight, still more preferably from 60 to 98% by weight, particularly preferably from 70 to 97% by weight. If the content of the thermoplastic resin in the transparent protective film is 50% by weight or less, high transparency and other properties inherent in the thermoplastic resin can fail to be sufficiently exhibited.

Moreover, as is described in JP-A No. 2001-343529 (WO 01/37007), polymer films, for example, resin compositions including (A) thermoplastic resins having substituted and/or non-substituted imido group in sidechain, and (B) thermoplastic resins having substituted and/or non-substituted phenyl and nitrile group in sidechain may be mentioned. As an illustrative example, a film may be mentioned that is made of a resin composition including alternating copolymer comprising iso-butylene and N-methyl maleimide, and acrylonitrile-styrene copolymer. A film comprising mixture extruded article of resin compositions etc. may be used. Since the films are less in retardation and less in photoelastic coefficient, faults such as unevenness due to a strain in a polarizing plate can be removed and besides, since they are less in moisture permeability, they are excellent in durability under humidified environment.

Thickness of the transparent protective film can be properly determined and generally in the range of from about 1 to about 500 µm from the viewpoint of a strength, workability such as handlability, requirement for a thin film and the like. Especially, the thickness is preferably in the range of from 1 to 300 µm and more preferably in the range of from 1 to 100 µm. Therefore, it is particularly preferred that the transparent protective film has a thickness of 1 to 90 µm, more preferable 1 to 50 µm.

Note that in a case where the transparent protective films are provided on both sides of a polarizer, the protective films made from the same polymer may be used on both sides thereof or alternatively, the protective films made from polymer materials different from each other may also be used on respective both sides thereof.

At least one selected from a cellulose resin, a polycarbonate resin, a cyclic polyolefin resin, and a (meth)acrylic resin is preferably used for the transparent protective film according to the present invention.

The cellulose resin is an ester of cellulose and a fatty acid. Examples of such a cellulose ester resin include triacetyl cellulose, diacetyl cellulose, tripropionyl cellulose, dipropionyl cellulose, and the like. In particular, triacetyl cellulose is preferred. Much commercially available triacetyl celluloses are placing on sale and are advantageous in view of easy availability and cost. Examples of commercially available products of triacetyl cellulose include UV-50, UV-80, SH-80, TD-80U, TD-TAC, and UZ-TAC (trade names) manufactured by Fujifilm Corporation, and KC series manufactured by Konica Minolta. In general, these triacetyl cellulose products have a thickness direction retardation (Rth) of about 60 nm or less, while having an in-plane retardation (Re) of almost zero.

Cellulose resin films with relatively small thickness direction retardation may be obtained by processing any of the above cellulose resins. Examples of the processing method include a method that includes laminating a general cellulose-based film to a base film such as a polyethylene terephthalate, polypropylene, or stainless steel film, coated with a solvent such as cyclopentanone or methyl ethyl ketone, drying the laminate by heating (for example, at 80 to 150° C. for 3 to 10 minutes) and then separating the base film; and a method that includes coating a general cellulose resin film with a solution of a norbornene resin, a (meth)acrylic resin or the like in a solvent such as cyclopentanone or methyl ethyl ketone, drying the coated film by heating (for example, at 80 to 150° C. for 3 to 10 minutes), and then separating the coating.

The cellulose resin film with a relatively small thickness direction retardation to be used may be a fatty acid cellulose resin film with a controlled degree of fat substitution. While triacetyl cellulose for general use has a degree of acetic acid substitution of about 2.8, preferably, the degree of acetic acid substitution is controlled to 1.8 to 2.7, so that the Rth can be reduced. The Rth may also be controlled to be low by adding a plasticizer such as dibutyl phthalate, p-toluenesulfonarilide, and acetyl triethyl citrate, to the fatty acid-substituted cellulose resin. The plasticizer is preferably added in amount of 40 parts by weight or less, more preferably of 1 to 20 parts by weight, still more preferably of 1 to 15 parts by weight, to 100 parts by weight of the fatty acid cellulose resin.

For example, the cyclic polyolefin resin is preferably a norbornene resin. Cyclic olefin resin is a generic name for resins produced by polymerization of cyclic olefin used as a polymerizable unit, and examples thereof include the resins disclosed in JP-A Nos. 01-240517, 03-14882, and 03-122137. Specific examples thereof include ring-opened (co)polymers of cyclic olefins, addition polymers of cyclic olefins, copolymers (typically random copolymers) of cyclic olefins and α-olefins such as ethylene and propylene, graft polymers produced by modification thereof with unsaturated carboxylic acids or derivatives thereof, and hydrides thereof. Examples of the cyclic olefin include norbornene monomers.

Various commercially available cyclic polyolefin resins are placing on sale. Examples thereof include Zeonex (trade name) and Zeonor (trade name) series manufactured by Zeon Corporation, Arton (trade name) series manufactured by JSR Corporation, Topas (trade name) series manufactured by Ticona, and Apel (trade name) series manufactured by Mitsui Chemicals, Inc.

The (meth)acrylic resin preferably has a glass transition temperature (Tg) of 115° C. or more, more preferably of 120° C. or more, still more preferably of 125° C. or more, particularly preferably of 130° C. or more. If the Tg is 115° C. or more, the resulting polarizing plate can have good durability. The upper limit to the Tg of the (meth)acxylic resin is preferably, but not limited to, 170° C. or less, in view of formability and the like. The (meth)acrylic resin can form a film with an in-plane retardation (Re) of almost zero and a thickness direction retardation (Rth) of almost zero.

Any appropriate (meth)acrylic resin may be used as long as the advantages of the present invention are not reduced. Examples of such a (meth)acrylic resin include poly(meth)acrylate such as poly(methyl methacrylate), methyl methacrylate-(meth)acrylic acid copolymers, methyl methacrylate-(meth)acrylate copolymers, methyl methacrylate-acrylate-(meth)acrylic acid copolymers, methyl(meth)acrylate-styrene copolymers (such as MS resins), and alicyclic hydrocarbon group-containing polymers (such as methyl methacrylate-cyclohexyl methacrylate copolymers and methyl methacrylate-norbomyl(meth)acrylate copolymers). Poly($C_{1-6}$ alkyl(meth)acrylate) such as poly(methyl (meth)acrylate) is preferred, and a methyl methacrylate-based resin mainly composed of a methyl methacrylate unit (50 to 100% by weight, preferably 70 to 100% by weight) is more preferred.

Examples of the (meth)acrylic resin include Acrypet VH and Acrypet VRL20A each manufactured by Mitsubishi Rayon Co., Ltd., (meth)acrylic resins having a ring structure in their molecule as disclosed in JP-A No. 2004-70296, and high-Tg (meth)acrylic resins produced by intramolecular crosslinking or intramolecular cyclization reaction.

Lactone ring structure-containing (meth)acrylic resins may also be used, because they have high heat resistance and high transparency and also have high mechanical strength after biaxially stretched.

Examples of the lactone ring structure-containing (meth)acrylic reins include the lactone ring structure-containing (meth)acrylic reins disclosed in JP-A Nos. 2000-230016, 2001-151814, 2002-120326, 2002-254544, and 2005-146084.

The lactone ring structure-containing (meth)acrylic reins preferably have a ring structure represented by Formula (I):

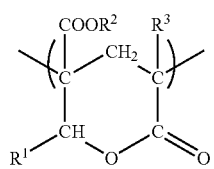

[Formula 1]

wherein $R^1$, $R^2$ and $R^3$ each independently represent a hydrogen atom or an organic residue of 1 to 20 carbon atoms. The organic residue may contain an oxygen atom(s).

The content of the lactone ring structure represented by Formula (I) in the lactone ring structure-containing (meth) acrylic resin is preferably from 5 to 90% by weight, more preferably from 10 to 70% by weight, still more preferably from 10 to 60% by weight, particularly preferably from 10 to 50% by weight. If the content of the lactone ring structure represented by Formula (I) in the lactone ring structure-containing (meth)acrylic resin is less than 5% by weight, its heat resistance, solvent resistance or surface hardness can be insufficient. If the content of the lactone ring structure represented by Formula (I) in the lactone ring structure-containing (meth)acrylic resin is more than 90% by weight, its formability or workability can be poor.

The lactone ring structure-containing (meth)acrylic resin preferably has a mass average molecular weight (also referred to as weight average molecular weight) of 1,000 to 2,000,000, more preferably of 5,000 to 1,000,000, still more preferably of 10,000 to 500,000, particularly preferably of 50,000 to 500,000. A mass average molecular weight outside the above range is not preferred in view of formability or workability.

The lactone ring structure-containing (meth)acrylic resin preferably has a Tg of 115° C. or more, more preferably of 120° C. or more, still more preferably of 125° C. or more, particularly preferably of 130° C. or more. For example, the resin with a Tg of 115° C. or more can produce good durability, when it is incorporated in the form of a transparent protective film in a polarizing plate. The upper limit to the Tg of the lactone ring structure-containing (meth)acrylic resin is preferably, but not limited to, 170° C. or less in view of formability and the like.

The total light transmittance of the lactone ring structure-containing (meth)acrylic resin, which may be measured according to ASTM-D-1003 with respect to injection molded products, is preferably as high as possible, and specifically, it is preferably 85% or more, more preferably 88% or more, still more preferably 90% or more. The total light transmittance is an index of transparency, and a total light transmittance of less than 85% can result in reduced transparency.

The transparent protective film to be used generally has an in-plane retardation of less than 40 nm and a thickness direction retardation of less than 80 nm. The in-plane retardation Re is expressed by the formula Re=(nx−ny)×d, the thickness direction retardation Rth is expressed by the formula Rth=(nx−nz)×d, and the Nz coefficient is represented by the formula Nz=(nx−nz)/(nx−ny), where nx, ny and nz are the refractive indices of the film in the directions of its slow axis, fast axis and thickness, respectively, d is the thickness (nm) of the film, and the direction of the slow axis is a direction in which the in-plane refractive index of the film is maximum. Moreover, it is preferable that the transparent protective film may have as little coloring as possible. A protective film having a thickness direction retardation of from −90 nm to +75 nm may be preferably used. Thus, coloring (optical coloring) of polarizing plate resulting from a protective film may mostly be cancelled using a protective film having a thickness direction retardation (Rth) of from −90 nm to +75 nm. The thickness direction retardation (Rth) is preferably from −80 nm to +60 nm, and especially preferably from −70 nm to +45 nm.

Alternatively, the transparent protective film to be used may be a retardation plate having an in-plane retardation of 40 nm or more and/or a thickness direction retardation of 80 nm or more. The in-plane retardation is generally controlled in the range of 40 to 200 nm, and the thickness direction retardation is generally controlled in the range of 80 to 300 nm. The retardation plate for use as the transparent protective film also has the function of the transparent protective film and thus can contribute to a reduction in thickness.

Examples of the retardation plate include a birefringent film produced by uniaxially or biaxially stretching a polymer material, an oriented liquid crystal polymer film, and an oriented liquid crystal polymer layer supported on a film. The thickness of the retardation plate is generally, but not limited to, from about 20 to about 150 μm.

Examples of the polymer material include polyvinyl alcohol, polyvinyl butyral, poly(methyl vinyl ether), poly(hydroxyethyl acrylate), hydroxyethyl cellulose, hydroxypropyl cellulose, methylcellulose, polycarbonate, polyarylate, polysulfone, polyethylene terephthalate, polyethylene naphthalate, polyethersulfone, polyphenylene sulfide, polyphenylene oxide, polyallylsulfone, polyamide, polyimide, polyolefin, polyvinyl chloride, cellulose resins, cyclic polyolefin resins (norbornene reins), and various types of binary or ternary copolymers thereof, graft copolymers thereof, and any blend thereof. Any of these polymer materials may be formed into an oriented product (a stretched film) by stretching or the like.

Examples of the liquid crystal polymer include various main-chain or side-chain types having a liquid crystal molecular orientation property-imparting conjugated linear atomic group (mesogen) introduced in a main or side chain of a polymer. Examples of the main chain type liquid crystal polymer include polymers having a mesogen group bonded thereto via a flexibility-imparting spacer moiety, such as nematically ordered polyester liquid-crystalline polymers, discotic polymers, and cholesteric polymers. For example, the side-chain type liquid crystal polymer may be a polymer comprising: a main chain skeleton of polysiloxane, polyacrylate, polymethacrylate, or polymalonate; and a side chain having a mesogen moiety that comprises a nematic orientation-imparting para-substituted cyclic compound unit and is bonded thereto via a spacer moiety comprising a conjugated atomic group. For example, any of these liquid crystal polymers may be applied by a process that includes spreading a solution of the liquid crystalline polymer on an alignment surface such as a rubbed surface of a thin film of polyimide, polyvinyl alcohol or the like, formed on the glass plate, and an obliquely vapor-deposited silicon oxide surface, and heat-treating it.

The retardation plate may have any appropriate retardation depending on the intended use such as compensation for coloration, viewing angle, or the like due to the birefringent of various wave plates or liquid crystal layers. Two or more types of retardation plates may also be laminated to provide controlled optical properties, including retardation.

A retardation plate satisfying the relation: nx=ny>nz, nx>ny>nz, nx>ny=nz, nx>nz>ny, nz=nx>ny, nz>nx>ny, or nz>nx=ny may be selected and used depending on various applications. The relation ny=nz includes not only the case where ny is completely equal to nz but also the case where ny is substantially equal to nz.

For example, the retardation plate satisfying the relation nx>ny>nz to be used preferably has an in-plane retardation of 40 to 100 nm, a thickness retardation of 100 to 320 nm, and an Nz coefficient of 1.8 to 4.5. For example, the retardation plate satisfying the relation nx>ny=nz (positive A plate) to be used preferably has an in-plane retardation of 100 to 200 nm. For example, the retardation plate satisfying the relation nz=nx>ny (negative A plate) to be used preferably has an in-plane retardation of 100 to 200 nm. For example, the retardation plate satisfying the relation nx>nz>ny to be used preferably has a in-plane retardation of 150 to 300 nm and an Nz coefficient of more than 0 and not more than 0.7. As described above, for example, the retardation plate satisfying the relation nx=ny>nz, nz>nx>ny or nz>nx=ny may also be used.

The transparent protective film may be appropriately selected depending on the liquid crystal display to be produced therewith. In the case of VA (Vertical Alignment, including MVA and PVA), it is preferred that the transparent protective film on at least one side of the polarizing plate (on the cell side) has a retardation. Specifically, it preferably has a retardation Re in the range of 0 to 240 nm and a retardation Rth in the range of 0 to 500 nm. In terms of three-dimensional refractive index, the case of nx>ny=nz, nx>ny>nz, nx>nz>ny, or nx=ny>nz (positive A-plate, biaxial, negative C-plate) is preferred. In the case of VA, a combination use of positive A-plate and negative C-plate, or a single use of biaxial is preferable. When polarizing plates are used on upper and lower sides of a liquid crystal cell, the transparent protective films may have a retardation on upper and lower sides of the liquid crystal cell, or one of the upper and lower transparent protective films may has a retardation.

For example, in the case of IPS an-Plane Switching, including FFS), the transparent protective film for use in one of the polarizing plates may have or may not have a retardation. For example, a transparent protective film with no retardation is preferably provided on both upper and lower sides of a liquid crystal cell (cell sides), or otherwise a transparent protective film with a retardation is preferably provided on both or one of the upper and lower sides of a liquid crystal cell (for example, biaxial film satisfying nx>nz>ny provided on the upper side with no retardation on the lower side or positive A-plate provided on the upper side with a positive C-plate provided on the lower side). When it has a retardation, it preferably has a retardation Re in the range of −500 to 500 nm and a retardation Rth in the range of −500 to 500 nm. In terms of three-dimensional refractive index, nx>ny=nz, nx>nz>ny, nz>nx=ny, or nz>nx>ny (positive A-plate, biaxial, positive C-plate) is preferred.

The film with retardation may be separately prepared and laminated to a transparent protective film with no retardation so that the function described above can be provided.

The transparent protective film may be subjected to surface modification treatment for improving the adhesion to the polarizer, before it is coated with an adhesive. Specific examples of the treatment include such as corona treatment, plasma treatment, flame treatment, ozone treatment, primer treatment, glow treatment, sanctification treatment, and coupling agent treatment. An antistatic layer may also be formed thereon appropriately.

A hard coat layer may be prepared, or antireflection processing, processing aiming at sticking prevention, diffusion or anti glare may be performed onto the face of the transparent protective film on which the polarizing film not been adhered.

A hard coat processing is applied for the purpose of protecting the surface of the polarizing plate from damage, and this hard coat film may be formed by a method in which, for example, a curable coated film with excellent hardness, slide property etc. is added on the surface of the protective film using suitable ultraviolet curable type resins, such as acrylic type and silicone type resins. Antireflection processing is applied for the purpose of antireflection of outdoor daylight on the surface of a polarizing plate and it may be prepared by forming an antireflection film according to the conventional method etc. Besides, a sticking prevention processing is applied for the purpose of adherence prevention with adjoining layer.

In addition, an anti glare processing is applied in order to prevent a disadvantage that outdoor daylight reflects on the surface of a polarizing plate to disturb visual recognition of transmitting light through the polarizing plate, and the processing may be applied, for example, by giving a fine concavo-convex structure to a surface of the protective film using, for example, a suitable method, such as rough surfacing treatment method by sandblasting or embossing and a method of combining transparent fine particle. As a fine particle combined in order to form a fine concavo-convex structure on the above-mentioned surface, transparent fine particles whose average particle size is 0.5 to 50 μm, for example, such as inorganic type fine particles that may have conductivity comprising silica, alumina, titania, zirconia, tin oxides, indium oxides, cadmium oxides, antimony oxides, etc., and organic type fine particles comprising cross-linked of non-cross-linked polymers may be used. When forming fine concavo-convex structure on the surface, the amount of fine particle used is usually about 2 to 70 weight parts to the transparent resin 100 weight parts that forms the fine concavo-convex structure on the surface, and preferably 5 to 50 weight parts. An anti glare layer may serve as a diffusion layer (viewing angle expanding function etc.) for diffusing transmitting light through the polarizing plate and expanding a viewing angle etc.

In addition, the above-mentioned antireflection layer, sticking prevention layer, diffusion layer, anti glare layer, etc. may be built in the protective film itself, and also they may be prepared as an optical layer different from the protective film.

The polarizer and the transparent protective film may be bonded together using an adhesive. Examples of the adhesive include such as isocyanate-based adhesives, polyvinyl alcohol-based adhesives, gelatin-based adhesives, vinyl-based adhesives, latex-based adhesives, and aqueous polyester adhesives. The adhesive is generally used in the form of an aqueous adhesive solution, which generally has a solids content of 0.5 to 60% by weight. Besides the above, ultraviolet-curable adhesives, electron beam-curable adhesives, or the like may also be used as the adhesive between the polarizer and the transparent protective film. Electron beam-curable adhesives for polarizing plate exhibit good adhesion to the various transparent protective films described above. Further, the adhesive used in an embodiment of the present invention may also contain metal compound filler.

A polarizing plate of the present invention may be used in practical use as an optical film laminated with other optical layers. Although there is especially no limitation about the optical layers, one layer or two layers or more of optical layers, which may be used for formation of a liquid crystal display etc., such as a reflector, a transflective plate, a retardation plate (a half wavelength plate and a quarter wavelength plate included), and a viewing angle compensation film, may be used. Especially preferable polarizing plates are; a reflection type polarizing plate or a transflective type polarizing plate in which a reflector or a transflective reflector is further laminated onto a polarizing plate of the present invention; an elliptically polarizing plate or a circular polarizing plate in which a retardation plate is further laminated onto the polarizing plate; a wide viewing angle polarizing plate in which a viewing angle compensation film is further laminated onto the polarizing plate; or a polarizing plate in which a brightness enhancement film is further laminated onto the polarizing plate.

A reflective layer is prepared on a polarizing plate to give a reflection type polarizing plate, and this type of plate is used for a liquid crystal display in which an incident light from a view side (display side) is reflected to give a display. This type of plate does not require built-in light sources, such as a backlight, but has an advantage that a liquid crystal display may easily be made thinner. A reflection type polarizing plate may be formed using suitable methods, such as a method in which a reflective layer of metal etc. is, if required, attached to one side of a polarizing plate through a transparent protective film etc.

As an example of a reflection type polarizing plate, a plate may be mentioned on which, if required, a reflective layer is formed using a method of attaching a foil and vapor deposition film of reflective metals, such as aluminum, to one side of a matte treated protective film. Moreover, a different type of plate with a fine concavo-convex structure on the surface obtained by mixing fine particle into the above-mentioned protective film, on which a reflective layer of concavo-convex structure is prepared, may be mentioned. The reflective layer that has the above-mentioned fine concavo-convex structure diffuses incident light by random reflection to prevent directivity and glaring appearance, and has an advantage of controlling unevenness of light and darkness etc. Moreover, the protective film containing the fine particle has an advantage that unevenness of light and darkness may be controlled more effectively, as a result that an incident light and its reflected light that is transmitted through the film are diffused. A reflective layer with fine concavo-convex structure on the surface effected by a surface fine concavo-convex structure of a protective film may be formed by a method of attaching a metal to the surface of a transparent protective film directly using, for example, suitable methods of a vacuum evaporation method, such as a vacuum deposition method, an ion plating method, and a sputtering method, and a plating method etc.

Instead of a method in which a reflection plate is directly given to the protective film of the above-mentioned polarizing plate, a reflection plate may also be used as a reflective sheet constituted by preparing a reflective layer on the suitable film for the transparent film. In addition, since a reflective layer is usually made of metal, it is desirable that the reflective side is covered with a protective film or a polarizing plate etc. when used, from a viewpoint of preventing deterioration in reflectance by oxidation, of maintaining an initial reflectance for a long period of time and of avoiding preparation of a protective layer separately etc.

In addition, a transflective type polarizing plate may be obtained by preparing the above-mentioned reflective layer as a transflective type reflective layer, such as a half-mirror etc. that reflects and transmits light. A transflective type polarizing plate is usually prepared in the backside of a liquid crystal cell and it may form a liquid crystal display unit of a type in which a picture is displayed by an incident light reflected from a view side (display side) when used in a comparatively well-lighted atmosphere. And this unit displays a picture, in a comparatively dark atmosphere, using embedded type light sources, such as a back light built in backside of a transflective type polarizing plate. That is, the transflective type polarizing plate is useful to obtain of a liquid crystal display of the type that saves energy of light sources, such as a back light, in a well-lighted atmosphere, and can be used with a built-in light source if needed in a comparatively dark atmosphere etc.

A description of the elliptically polarizing plate or circularly polarizing plate in which the retardation plate is laminated to the polarizing plate will be made in the following paragraph. These polarizing plates change linearly polarized light into elliptically polarized light or circularly polarized light, elliptically polarized light or circularly polarized light into linearly polarized light or change the polarization direction of linearly polarization by a function of the retardation plate. As a retardation plate that changes circularly polarized light into linearly polarized light or linearly polarized light into circularly polarized light, what is called a quarter wavelength plate (also called $\lambda/4$ plate) is used. Usually, half-wavelength plate (also called $\lambda/2$ plate) is used, when changing the polarization direction of linearly polarized light.

Elliptically polarizing plate is effectively used to give a monochrome display without above-mentioned coloring by compensating (preventing) coloring (blue or yellow color) produced by birefringence of a liquid crystal layer of a super twisted nematic (STN) type liquid crystal display. Furthermore, a polarizing plate in which three-dimensional refractive index is controlled may also preferably compensate (prevent) coloring produced when a screen of a liquid crystal display is viewed from an oblique direction. Circularly polarizing plate is effectively used, for example, when adjusting a color tone of a picture of a reflection type liquid crystal display that provides a colored picture, and it also has function of antireflection. For example, a retardation plate may be used that compensates coloring and viewing angle, etc. caused by birefringence of various wavelength plates or liquid crystal layers etc. Besides, optical characteristics, such as retardation, may be controlled using laminated layer with two or more sorts of retardation plates having suitable retardation value according to each purpose. As retardation plates, birefringence films formed by stretching films comprising suitable polymers, such as polycarbonates, norbornene type resins, polyvinyl alcohols, polystyrenes, poly methyl methacrylates, polypropylene; polyarylates and polyamides; aligned films comprising liquid crystal materials, such as liquid crystal polymer; and films on which an alignment layer of a liquid crystal material is supported may be mentioned. A retardation plate may be a retardation plate that has a proper retardation according to the purposes of use, such as various kinds of wavelength plates and plates aiming at compensation of coloring by birefringence of a liquid crystal layer and of visual angle, etc., and may be a retardation plate in which two or more sorts of retardation plates is laminated so that optical properties, such as retardation, may be controlled.

The above-mentioned elliptically polarizing plate and an above-mentioned reflected type elliptically polarizing plate are laminated plate combining suitably a polarizing plate or a reflection type polarizing plate with a retardation plate. This type of elliptically polarizing plate etc. may be manufactured by combining a polarizing plate (reflected type) and a retardation plate, and by laminating them one by one separately in the manufacture process of a liquid crystal display. On the other hand, the polarizing plate in which lamination was beforehand carried out and was obtained as an optical film, such as an elliptically polarizing plate, is excellent in a stable quality, a workability in lamination etc., and has an advantage in improved manufacturing efficiency of a liquid crystal display.

A viewing angle compensation film is a film for extending viewing angle so that a picture may look comparatively clearly, even when it is viewed from an oblique direction not from vertical direction to a screen. As such a viewing angle compensation retardation plate, in addition, a film having birefringence property that is processed by uniaxial stretching or orthogonal biaxial stretching and a biaxial stretched film as inclined alignment film etc. may be used. As inclined alignment film, for example, a film obtained using a method in which a heat shrinking film is adhered to a polymer film, and then the combined film is heated and stretched or shrunk under a condition of being influenced by a shrinking force, or a film that is aligned in oblique direction may be mentioned. The viewing angle compensation film is suitably combined for the purpose of prevention of coloring caused by change of visible angle based on retardation by liquid crystal cell etc. and of expansion of viewing angle with good visibility.

Besides, a compensation plate in which an optical anisotropy layer consisting of an alignment layer of liquid crystal polymer, especially consisting of an inclined alignment layer of discotic liquid crystal polymer is supported with triacetyl cellulose film may preferably be used from a viewpoint of attaining a wide viewing angle with good visibility.

The polarizing plate with which a polarizing plate and a brightness enhancement film are adhered together is usually used being prepared in a backside of a liquid crystal cell. A brightness enhancement film shows a characteristic that reflects linearly polarized light with a predetermined polarization axis, or circularly polarized light with a predetermined direction, and that transmits other light, when natural light by back lights of a liquid crystal display or by reflection from a back-side etc., comes in. The polarizing plate, which is obtained by laminating a brightness enhancement film to a polarizing plate, thus does not transmit light without the predetermined polarization state and reflects it, while obtaining transmitted light with the predetermined polarization state by accepting a light from light sources, such as a backlight. This polarizing plate makes the light reflected by the brightness enhancement film further reversed through the reflective layer prepared in the backside and forces the light re-enter into the brightness enhancement film, and increases the quantity of the transmitted light through the brightness enhancement film by transmitting a part or all of the light as light with the predetermined polarization state. The polarizing plate simultaneously supplies polarized light that is difficult to be absorbed in a polarizer, and increases the quantity of the light usable for a liquid crystal picture display etc., and as a result luminosity may be improved. That is, in the case where the light enters through a polarizer from backside of a liquid crystal cell by the back light etc. without using a brightness enhancement film, most of the light, with a polarization direction different from the polarization axis of a polarizer, is absorbed by the polarizer, and does not transmit through the polarizer. This means that although influenced with the characteristics of the polarizer used, about 50 percent of light is absorbed by the polarizer, the quantity of the light usable for a liquid crystal picture display etc. decreases so much, and a resulting picture displayed becomes dark. A brightness enhancement film does not enter the light with the polarizing direction absorbed by the polarizer into the polarizer but reflects the light once by the brightness enhancement film, and further makes the light reversed through the reflective layer etc. prepared in the backside to re-enter the light into the brightness enhancement film. By this above-mentioned repeated operation, only when the polarization direction of the light reflected and reversed between the both becomes to have the polarization direction which may pass a polarizer, the brightness enhancement film transmits the light to supply it to the polarizer. As a result, the light from a backlight may be efficiently used for the display of the picture of a liquid crystal display to obtain a bright screen.

A diffusion plate may also be prepared between brightness enhancement film and the above described reflective layer, etc. A polarized light reflected by the brightness enhancement film goes to the above described reflective layer etc., and the diffusion plate installed diffuses passing light uniformly and changes the light state into depolarization at the same time. That is, the diffusion plate returns polarized light to natural light state. Steps are repeated where light, in the unpolarized state, i.e., natural light state, reflects through reflective layer and the like, and again goes into brightness enhancement film through diffusion plate toward reflective layer and the like. Diffusion plate that returns polarized light to the natural light state is installed between brightness enhancement film and the above described reflective layer, and the like, in this way, and thus a uniform and bright screen may be provided while maintaining brightness of display screen, and simultaneously controlling non-uniformity of brightness of the display screen. By preparing such diffusion plate, it is considered that number of repetition times of reflection of a first incident light increases with sufficient degree to provide uniform and bright display screen conjointly with diffusion function of the diffusion plate.

The suitable films are used as the above-mentioned brightness enhancement film. Namely, multilayer thin film of a dielectric substance; a laminated film that has the characteristics of transmitting a linearly polarized light with a predetermined polarizing axis, and of reflecting other light, such as the multilayer laminated film of the thin film having a different refractive-index anisotropy; an aligned film of cholesteric liquid-crystal polymer; a film that has the characteristics of reflecting a circularly polarized light with either left-handed or right-handed rotation and transmitting other light, such as a film on which the aligned cholesteric liquid crystal layer is supported; etc. may be mentioned.

Therefore, in the brightness enhancement film of a type that transmits a linearly polarized light having the above-mentioned predetermined polarization axis, by arranging the polarization axis of the transmitted light and entering the light into a polarizing plate as it is, the absorption loss by the polarizing plate is controlled and the polarized light can be transmitted efficiently. On the other hand, in the brightness enhancement film of a type that transmits a circularly polarized light as a cholesteric liquid-crystal layer, the light may be entered into a polarizer as it is, but it is desirable to enter the light into a polarizer after changing the circularly polarized light to a linearly polarized light through a retardation plate, taking control an absorption loss into consideration. In addition, a circularly polarized light is convertible into a linearly polarized light using a quarter wavelength plate as the retardation plate.

A retardation plate that works as a quarter wavelength plate in a wide wavelength ranges, such as a visible-light band, is obtained by a method in which a retardation layer working as a quarter wavelength plate to a pale color light with a wavelength of 550 nm is laminated with a retardation layer having other retardation characteristics, such as a retardation layer working as a half-wavelength plate. Therefore, the retardation plate located between a polarizing plate and a brightness enhancement film may consist of one or more retardation layers.

In addition, also in a cholesteric liquid-crystal layer, a layer reflecting a circularly polarized light in a wide wavelength ranges, such as a visible-light band, may be obtained by adopting a configuration structure in which two or more layers with different reflective wavelength are laminated together. Thus a transmitted circularly polarized light in a wide wavelength range may be obtained using this type of cholesteric liquid-crystal layer.

Moreover, the polarizing plate may consist of multi-layered film of laminated layers of a polarizing plate and two of more of optical layers as the above-mentioned separated type polarizing plate. Therefore, a polarizing plate may be a reflection type elliptically polarizing plate or a semi-transmission type elliptically polarizing plate, etc. in which the above-mentioned reflection type polarizing plate or a transflective type polarizing plate is combined with above described retardation plate respectively.

Although an optical film with the above described optical layer laminated to the polarizing plate may be formed by a method in which laminating is separately carried out sequentially in manufacturing process of a liquid crystal display etc., an optical film in a form of being laminated beforehand has an outstanding advantage that it has excellent stability in quality and assembly workability, etc., and thus manufacturing processes ability of a liquid crystal display etc. may be raised. Proper adhesion means, such as an adhesive layer, may be used for laminating. On the occasion of adhesion of the above described polarizing plate and other optical films, the optical axis may be set as a suitable configuration angle according to the target retardation characteristics etc.

In the polarizing plate mentioned above and the optical film in which at least one layer of the polarizing plate is laminated, a pressure-sensitive adhesive layer may also be prepared for adhesion with other members, such as a liquid crystal cell etc. As pressure-sensitive adhesive that forms pressure-sensitive layer is not especially limited, and, for example, acrylic type polymers; silicone type polymers; polyesters, polyurethanes, polyamides, polyethers; fluorine type and rubber type polymers may be suitably selected as a base polymer. Especially, a pressure-sensitive adhesive such as acrylics type pressure-sensitive adhesives may be preferably used, which is excellent in optical transparency, showing adhesion characteristics with moderate wettability, cohesiveness and adhesive property and has outstanding weather resistance, heat resistance, etc.

Moreover, a pressure-sensitive adhesive layer with low moisture absorption and excellent heat resistance is desirable. This is because those characteristics are required in order to prevent foaming and peeling-off phenomena by moisture absorption, in order to prevent decrease in optical characteristics and curvature of a liquid crystal cell caused by thermal expansion difference etc. and in order to manufacture a liquid crystal display excellent in durability with high quality.

The pressure-sensitive adhesive layer may contain additives, for example, such as natural or synthetic resins, adhesive resins, glass fibers, glass beads, metal powder, fillers comprising other inorganic powder etc., pigments, colorants and antioxidants. Moreover, it may be a pressure-sensitive adhesive layer that contains fine particle and shows optical diffusion nature.

Proper method may be carried out to attach a pressure-sensitive adhesive layer to one side or both sides of a polarizing plate or an optical film. As an example, about 10 to about 40 weight % of the pressure-sensitive adhesive solution in which a base polymer or its composition is dissolved or dispersed, for example, toluene or ethyl acetate or a mixed solvent of these two solvents is prepared. A method in which this solution is directly applied on a polarizing plate top or an optical film top using suitable developing methods, such as flow method and coating method, or a method in which a pressure-sensitive adhesive layer is once formed on a separator, as mentioned above, and is then transferred on a polarizing plate or an optical film may be mentioned.

A pressure-sensitive adhesive layer may also be prepared on one side or both sides of a polarizing plate or an optical film as a layer in which pressure-sensitive adhesives with different composition or different kind etc. are laminated together. Moreover, when pressure-sensitive adhesive layers are prepared on both sides, pressure-sensitive adhesive layers that have different compositions, different kinds or thickness, etc. may also be used on front side and backside of a polarizing plate or an optical film. Thickness of a pressure-sensitive adhesive layer may be suitably determined depending on a purpose of usage or adhesive strength, etc., and generally is 1 to 40 μm, preferably 1 to 300 μm, and more preferably 10 to 25 μm. If the thickness is less than 1 μm, its durability can be poor. If the thickness is more than 40 μm, separation or peeling is likely to occur due to foaming or the like so that the appearance can be degraded.

A temporary separator is attached to an exposed side of a pressure-sensitive adhesive layer to prevent contamination etc., until it is practically used. Thereby, it can be prevented that foreign matter contacts pressure-sensitive adhesive layer in usual handling. As a separator, without taking the above-mentioned thickness conditions into consideration, for example, suitable conventional sheet materials that is coated, if necessary, with release agents, such as silicone type, long chain alkyl type, fluorine type release agents, and molybdenum sulfide may be used. As a suitable sheet material, plastics films, rubber sheets, papers, cloths, no woven fabrics, nets, foamed sheets and metallic foils or laminated sheets thereof may be used.

In order to increase the adhesion between the polarizing plate and the pressure-sensitive adhesive layer, an anchor layer may be placed between them.

An anchoring agent selected from polyurethane, polyester and a polymer having an amino group in its molecule may be preferably used as a material for forming the anchor layer. The polymer having an amino group in its molecule is particularly preferred. The amino group in the polymer molecule makes interaction such as a reaction or ionic interaction with the carboxyl group or the like in the pressure-sensitive adhesive so that good adhesion can be ensured.

Examples of the polymers having an amino group in its molecule include polymers of an amino group-containing monomer such as polyethyleneimine, polyallylamine, polyvinylamine, polyvinylpyridine, polyvinylpyrrolidine, and dimethylaminoethyl acrylate.

An antistatic agent may also be added to the anchor layer in order to impart antistatic properties. Examples of the antistatic agent that may be used to impart antistatic properties include ionic surfactants, electrically-conductive polymers such as polyaniline, polythiophene, polypyrrole, and polyquinoxaline, and metal oxides such as tin oxide, antimony oxide and indium oxide. Electrically-conductive polymers are preferably used in view of optical properties, appearance, antistatic effect, and stability of antistatic effect during heating or humidifying. In particular, water-dispersible or water-soluble electrically-conductive polymers such as polyaniline and polythiophene are preferably used. When water-soluble or water-dispersible electrically-conductive polymers are used as a material for forming the antistatic layer, organic solvent-induced deterioration of the optical film substrate can be prevented in the coating process.

In addition, in the present invention, ultraviolet absorbing property may be given to the above-mentioned each layer, such as a polarizer for a polarizing plate, a transparent protective film and an optical film etc. and a pressure-sensitive adhesive layer, using a method of adding UV absorbents, such as salicylic acid ester type compounds, benzophenol type compounds, benzotriazol type compounds, cyano acrylate type compounds, and nickel complex salt type compounds.

A polarizing plate or an optical film of the present invention may be preferably used for manufacturing various equipment, such as liquid crystal display, etc. Assembling of a liquid crystal display may be carried out according to conventional methods. That is, a liquid crystal display is generally manufactured by suitably assembling several parts such as a liquid crystal cell, polarizing plates or optical films and, if necessary, lighting system, and by incorporating driving circuit. In the present invention, except that a polarizing plate or an optical film by the present invention is used, there is especially no limitation to use any conventional methods. Also any liquid crystal cell of arbitrary type, such as TN type, and STN type, π type may be used.

Suitable liquid crystal displays, such as liquid crystal display with which the above-mentioned polarizing plate or optical film has been located at one side or both sides of the liquid crystal cell, and with which a backlight or a reflector is used for a lighting system may be manufactured. In this case, the polarizing plate or optical film by the present invention may be installed in one side or both sides of the liquid crystal cell. When installing the polarizing plate or optical films in both sides, they may be of the same type or of different type. Furthermore, in assembling a liquid crystal display, suitable parts, such as diffusion plate, anti-glare layer, antireflection film, protective plate, prism array, lens array sheet, optical diffusion plate, and backlight, may be installed in suitable position in one layer or two or more layers.

Subsequently, organic electro luminescence equipment (organic EL display) will be explained. Generally, in organic EL display, a transparent electrode, an organic emitting layer and a metal electrode are laminated on a transparent substrate in an order configuring an illuminant (organic electro luminescence muminant). Here, an organic emitting layer is a laminated material of various organic thin films, and much compositions with various combination are known, for example, a laminated material of hole injection layer comprising triphenylamine derivatives etc., a luminescence layer comprising fluorescent organic solids, such as anthracene; a laminated material of electronic injection layer comprising such a luminescence layer and perylene derivatives, etc.; laminated material of these hole injection layers, luminescence layer, and electronic injection layer etc.

An organic EL display emits light based on a principle that positive hole and electron are injected into an organic emitting layer by impressing voltage between a transparent electrode and a metal electrode, the energy produced by recombination of these positive holes and electrons excites fluorescent substance, and subsequently light is emitted when excited fluorescent substance returns to ground state. A mechanism called recombination which takes place in an intermediate process is the same as a mechanism in common diodes, and, as is expected, there is a strong non-linear relationship between electric current and luminescence strength accompanied by rectification nature to applied voltage.

In an organic EL display, in order to take out luminescence in an organic emitting layer, at least one electrode must be transparent. The transparent electrode usually formed with transparent electric conductor, such as indium tin oxide (ITO), is used as an anode. On the other hand, in order to make electronic injection easier and to increase luminescence efficiency, it is important that a substance with small work function is used for cathode, and metal electrodes, such as Mg—Ag and Al—Li, are usually used.

In organic EL display of such a configuration, an organic emitting layer is formed by a very thin film about 10nm in thickness. For this reason, light is transmitted nearly completely through organic emitting layer as through transparent electrode. Consequently, since the light that enters, when light is not emitted, as incident light from a surface of a transparent substrate and is transmitted through a transparent electrode and an organic emitting layer and then is reflected by a metal electrode, appears in front surface side of the transparent substrate again, a display side of the organic EL display looks like mirror if viewed from outside.

In an organic EL display containing an organic electro luminescence illuminant equipped with a transparent electrode on a surface side of an organic emitting layer that emits light by impression of voltage, and at the same time equipped with a metal electrode on a back side of organic emitting layer, a retardation plate may be installed between these transparent electrodes and a polarizing plate, while preparing the polarizing plate on the surface side of the transparent electrode.

Since the retardation plate and the polarizing plate have function polarizing the light that has entered as incident light from outside and has been reflected by the metal electrode, they have an effect of making the mirror surface of metal electrode not visible from outside by the polarization action. If a retardation plate is configured with a quarter wavelength plate and the angle between the two polarization directions of the polarizing plate and the retardation plate is adjusted to π/4, the mirror surface of the metal electrode may be completely covered.

This means that only linearly polarized light component of the external light that enters as incident light into this organic EL display is transmitted with the work of polarizing plate. This linearly polarized light generally gives an elliptically polarized light by the retardation plate, and especially the retardation plate is a quarter wavelength plate, and moreover when the angle between the two polarization directions of the polarizing plate and the retardation plate is adjusted to π/4, it gives a circularly polarized light.

This circularly polarized light is transmitted through the transparent substrate, the transparent electrode and the organic thin film, and is reflected by the metal electrode, and then is transmitted through the organic thin film, the transparent electrode and the transparent substrate again, and is turned into a linearly polarized light again with the retardation plate. And since this linearly polarized light lies at right angles to the polarization direction of the polarizing plate, it cannot be transmitted through the polarizing plate. As the result, mirror surface of the metal electrode may be completely covered.

EXAMPLES

The present invention is more specifically described below with reference to some examples and comparative examples; however the present invention is not limited to these examples and comparative examples.

Production Example 1

Production of Polarizing Plate

A polyvinyl alcohol film was impregnated with iodine and stretched so that a 30 μm-thick polarizer was obtained. Triacetylcellulose films each with a thickness of 40 μm were bonded to both sides of the polarizer with a polyvinyl alcohol-based adhesive layer interposed therebetween so that a polarizing plate was formed. The thickness of the polarizing plate (exclusive of the thickness of the adhesive layer) was 190 µm.

Production Example 2

Production of Polarizing Plate

A polyvinyl alcohol film was impregnated with iodine and stretched so that a 30 µm-thick polarizer was obtained. Triacetylcellulose films each with a thickness of 80 µm were bonded to both sides of the polarizer with a polyvinyl alcohol-based adhesive layer interposed therebetween so that a polarizing plate was formed. The thickness of the polarizing plate (exclusive of the thickness of the adhesive layer) was 190 µm.

Example 1

Preparation of Non-Rectangular Polarizing Plate

The polarizing plate obtained in Production Example 1 was formed into the shape shown in FIG. 1A by punching with a Thomson die cutter so that a non-rectangular polarizing plate was obtained. Specifically, the sides and the angle according to FIG. 1A were as follows: a'=700 mm; b=400 mm; c=700 mm; d=400 mm; $\theta 11$=1°.

Examples 2 to 4 and Comparative Example 1

Preparation of Non-Rectangular Polarizing Plate

Non-rectangular polarizing plates were obtained using the process of Example 1, except that $\theta 11$ was changed as shown in Table 1 with respect to the shape shown in FIG. 1A.

Example 5

Preparation of Non-Rectangular Polarizing Plate

The polarizing plate obtained in Production Example 1 was formed into the shape shown in FIG. 2A by punching with a Thomson die cutter so that a non-rectangular polarizing plate was obtained. Specifically, the sides and the angles according to FIG. 2A were as follows: a'=700 mm; b'=400 mm; c=700 mm; d=400 mm; $\theta 21$=3°; $\theta 22$=3°0.

Comparative Example 2 and Reference Example 1

Preparation of Rectangular Polarizing Plate

The polarizing plate obtained in Production Example 1 or 2 was formed into the shape shown in FIG. 5 by punching with a Thomson die cutter so that a rectangular polarizing plate was obtained. Specifically, the sides according to FIG. 5 were as follows: a=700 mm; b=400 mm; c=700 mm; d=400 mm.

Evaluation

The polarizing plate obtained in each of the examples, the comparative examples and the reference example was coated with a 25 µm-thick acrylic pressure-sensitive adhesive layer. The resulting pressure-sensitive adhesive layer-carrying polarizing plate was then laminated to a glass substrate. After the laminating, the polarizing plate was peeled off in the diagonal direction of the polarizing plate (the direction of the diagonal between the corner a-b and the corner c-d). This process was performed on 100 pieces of the polarizing plate. The percentage of the unbroken polarizing plates in all the polarizing plates peeled off is shown as a success rate (percentage) in Table 1.

TABLE 1

| | Polarizing Plate | | | Angle (°) between Non-Rectangular Shape and Hypothetical Rectangle | | | Reworking Success Rate (%) |
|---|---|---|---|---|---|---|---|
| | Type | Thickness (µm) | Shape | $\theta 11$ | $\theta 21$ | $\theta 22$ | |
| Example 1 | Production Example 1 | 110 | FIG. 1 (A) | 1 | | | 45 |
| Example 2 | Production Example 1 | 110 | FIG. 1 (A) | 3 | | | 50 |
| Example 3 | Production Example 1 | 110 | FIG. 1 (A) | 5 | | | 60 |
| Example 4 | Production Example 1 | 110 | FIG. 2 (A) | | 3 | 3 | 80 |
| Comparative Example 1 | Production Example 1 | 110 | FIG. 1 (A) | 0.5 | | | 40 |
| Comparative Example 2 | Production Example 1 | 110 | FIG. 5 | 0 | 0 | 0 | 40 |
| Reference Example 1 | Production Example 2 | 190 | FIG. 5 | 0 | 0 | 0 | 100 |

The conventional rectangular polarizing plate and the polarizing plates of Comparative Examples 1 and 2, which are non-rectangular but fail to satisfy the requirements according to the present invention, show relatively low reworking success rates, when they are relatively thin. Here, it should be noted that although Reference Example 1 is a rectangular polarizing plate, it has good reworkability, because it is not relatively thin. In contrast, when the requirements for the non-rectangular shape according to the present invention are satisfied, even thin polarizing plates as shown in the examples can have a reworking success rate higher than that of Comparative Example 1 or 2.

What is claimed is:
1. A polarizing plate, comprising:
   main four sides which form a quadrangle or a substantially quadrangular shape, wherein the quadrangle or the substantially quadrangular shape is a non-rectangular shape having four interior angles each of which is in the range of 80° to 100°, provided that at least two of the four interior angles are not 90°, the non-rectangular polarizing plate has an in-plane absorption axis, a largest rectangle having four sides in directions parallel and perpendicular to the absorption axis of the polarizing plate can be drawn as a hypothetical rectangle in the plane of the non-rectangular polarizing plate, the hypothetical rectangle has a side which is closest to the non-rectangular shape and makes angles in the range of 0° to 5° with the non-rectangular shape, and at least one of the angles is an acute angle in the range of 1° to 5°.

2. The polarizing plate according to claim 1, wherein the polarizing plate has a thickness of 120 μm or less.

3. The polarizing plate of according to claim 1, wherein the non-rectangular polarizing plate has a longest side with a length of 700 mm or more.

4. An optical film, comprising a laminate having at least one piece of the polarizing plate according to claim 1.

5. An image display, comprising the polarizing plate according to claim 1.

6. An image display, comprising the optical film according to claim 4.

* * * * *